Aug. 21, 1934.  A. WALTON  1,970,990
TRUCK
Filed Oct. 6, 1933
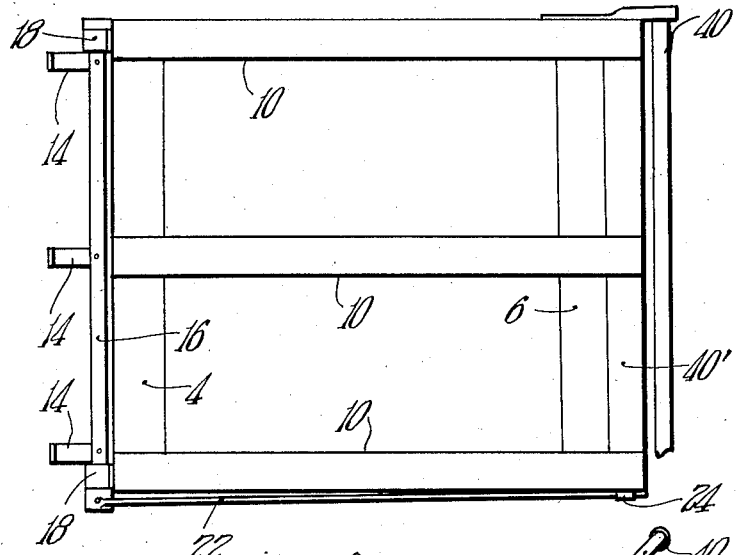
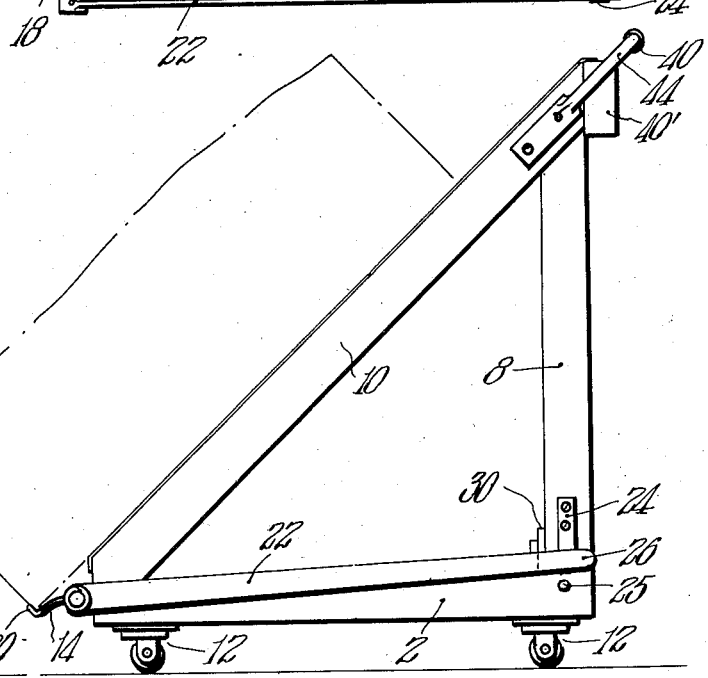
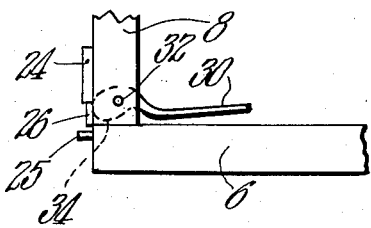
INVENTOR.
Albert Walton.
BY
Walter C Ross
ATTORNEY.

Patented Aug. 21, 1934

1,970,990

UNITED STATES PATENT OFFICE 1,970,990

TRUCK

Albert Walton, Springfield, Mass., assignor to Old Colony Envelope Company, Westfield, Mass., a corporation of Massachusetts Application October 6, 1933, Serial No. 692,477

1 Claim. (Cl. 280—49)

This invention relates to improvements in trucks and has for its principal object the provision of a truck adapted both for transporting shipping-cases, boxes, and the like and for supporting them while they are being filled, closed, or otherwise worked upon.

The truck of the invention in a broad way includes a frame or body having an upper box-supporting surface which inclines downwardly from a rear side to a forward side, which forward side is provided with a plurality of stops against which a lower, forward edge of a box may rest. The truck is adapted to support a box, shipping-case or the like in such a way that it may be easily packed thereon and is preferably provided with rolling means such as casters so that the filled box may be readily moved from the packing station to a place where it may be closed on its upper side and/or marked or otherwise worked upon, whence it may be transported to storage or directly loaded onto a car or shipping vehicle.

The stops above-mentioned are so arranged that they hold a box on the truck but may be instantly released so that the box slides down the inclined surface to bring the lower forward edge of the box onto the floor or the like when the weight of the box and contents will cause the case to assume an upright position on the floor or other supporting surface.

The truck of the invention is simple in form so as to be economical to manufacture and by reason thereof a factory may be provided with a large number of such trucks and they may be stored with boxes thereon until it is desired to ship them or otherwise move them.

Various novel features and advantages of the invention will be more fully hereinafter referred to in connection with the accompanying description in which reference is had to the accompanying drawing which illustrates the present preferred embodiment of the invention. However, it will be understood that in order to adapt the truck for various uses and conditions it may be varied in form without departing from the spirit and scope of the invention. In the drawing:

Fig. 1 represents a side elevational view of a truck embodying the novel features of the invention.

Fig. 2 is a plan view of the same.

Fig. 3 is a small scale fragmentary elevational view showing certain features of the novel construction.

Referring now to the drawing more in detail the embodiment of the invention at present preferred will be described.

A body or frame is provided which may consist of side rails 2, a forward rail 4, and a rear rail 6. Posts 8 extending upwardly from the rear side of the frame and upper rails 10 extend in inclined relation from the upper sides of the posts 8 downwardly to the forward side of the truck. It will be understood that the parts described may be suitably joined together in some manner to provide a rigid and strong body or frame structure and that the parts may be made from wood, metal or other material, whatever may be desired.

Casters represented generally by 12 are preferably secured to the underside of the body so that the same may be readily moved about.

A stop or stop members 14 are secured in some manner to a rod or shaft 16 which is suitably journalled in a bearing or bearings 18 carried by the frame at its forward side. These stop members 14 have forward upwardly extending lip portions 20 which are adapted and arranged when in the position shown in Fig. 1 to engage the forward bottom edge of a box such as indicated by dot-dash lines B.

A locking lever 22 is fixed in some manner to the shaft 16 and extends rearwardly of the truck as shown in Fig. 1. A lock 24 is carried by the frame and is so arranged that the rear free end 26 of the lever 22 may underlie the same. Thus, when the lever 22 is in the position shown in Fig. 1, with its free end 26 beneath the lock 24, the hook or stop members 4 are held in their stop-supporting position shown.

However, the lever 22 is connected to the shaft 18 in such a way that it may be moved outwardly to swing its free end 26 upwardly past the lock 24. A release treadle 30 is provided which is preferably pivoted at 32 to the post 8 and it has an end portion 34 which is engageable with the lever 22. In this way, by depressing the treadle 30 the lever 22 may be moved outwardly from beneath the lock 24 so that it may swing upwardly. The said treadle 30 is so formed and arranged that it may be engaged by the foot to facilitate ease in manipulating the truck.

A handle member 40 is carried in the outer ends of brackets 44 which are secured to the rails in the upper side of the frame. By this means, an operator may move the truck about the floor. A tie member 40' preferably extends between and is secured to the upper part of rails 10 and posts 8 to strengthen the structure at its upper side.

It will be noticed that the rails 10 provide a supporting surface for a box or case in an inclined relation so that the box at its lower forward corner rests against the stop members 4. In this way, with the box supported in the inclined relation shown in Fig. 1, it is an easy manner to pack or fill the same. Then when the box is packed or filled, the truck may be moved about to transport the box to the shipping room, for instance, where it may be closed and/or marked. With the box supported in this inclined manner, it may be seen that the closing thereof, as by nailing on the cover board, is a relatively easy matter; also once the box is closed, it may be readily transported by means of the truck to the place of storage or elsewhere as may be desired.

When it is desired to release the box or to set it on its side or end, the treadle 30 is depressed to move the lever 22 outwardly so that it is released by the lock 24. The weight of the box, being inclined as it is, then causes the hook or stop members 14 to swing downwardly so that the box passes over the lips 30 and the lower forward edge thereof strikes the floor or other supporting surface when the box will tilt forwardly into an upright position. Thus, by releasing the stop members, the box may be simultaneously loaded or otherwise deposited in its desired location and set up on a side or end in an upright position.

According to the preferred form of the invention, a stop member 25 is provided on the frame of the structure to limit the downward movement of the lever 22, as shown.

The truck may be varied in form and in detailed construction so as to adapt the novel features thereof to various purposes and therefore it is not desired to be limited by the specific form of the invention shown, but if at all, by the appended claim.

What I claim is:

A truck of the class described comprising in combination, a substantially triangular frame including a base formed by horizontally extending rails connected to one another and upright members extending upwardly from the rear side of said base at substantially right angles thereto and supporting rails extending between the upper ends of said uprights and the forward side of said base to provide an upper box-supporting surface which inclines forwardly and downwardly, wheels carried by axles beneath the forward and rear sides of said base for supporting said frame, an oscillatable shaft journalled in bearings provided at the forward lower side of the frame, spaced retaining members secured to said shaft having forwardly extending lip portions for normally lying in front of and engaging the lowermost edge of a box supported on said inclining surface to prevent downward movements of the box on said surface, a substantially horizontally extending lever member for oscillating said shaft having its forward end secured to the shaft and its rear end extending freely away therefrom, and releasable locking means associated with the rear lower side of said frame for engaging said rear end of the lever to normally hold said shaft against oscillation, all adapted and arranged whereby said shaft may be oscillated by said lever to move said retaining members downwardly so they lie below the plane of said inclined box-supporting surface to permit a box supported on said surface to slide downwardly thereon past said retaining members to rest on a surface beneath said wheels.

ALBERT WALTON.